United States Patent
Chen et al.

(10) Patent No.: US 11,916,788 B2
(45) Date of Patent: Feb. 27, 2024

(54) DETERMINATION OF ROUTING DOMAIN INFORMATION TO MERGE IP ADDRESSES

(71) Applicant: MICRO FOCUS LLC, Santa Clara, CA (US)

(72) Inventors: Yiming Chen, Shanghai (CN); Qiuxia Song, Shanghai (CN); Liping Sun, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/380,730

(22) Filed: Jul. 20, 2021

(65) Prior Publication Data
US 2023/0034790 A1 Feb. 2, 2023

(51) Int. Cl.
| | | |
|---|---|---|
| H04L 45/745 | (2022.01) | |
| H04L 45/586 | (2022.01) | |
| H04L 41/0816 | (2022.01) | |
| H04L 45/42 | (2022.01) | |
| H04L 61/5046 | (2022.01) | |

(52) U.S. Cl.
CPC ........ *H04L 45/745* (2013.01); *H04L 41/0816* (2013.01); *H04L 45/42* (2013.01); *H04L 45/586* (2013.01); *H04L 61/5046* (2022.05)

(58) Field of Classification Search
CPC ............... H04L 45/745; H04L 41/0816; H04L 45/42; H04L 45/586; H04L 61/2046
See application file for complete search history.

(56) References Cited

U.S. PATENT DOCUMENTS

| | | | |
|---|---|---|---|
| 9,392,029 B2 | 7/2016 | Lee et al. | |
| 9,912,632 B2 | 3/2018 | Liebherr | |
| 10,057,167 B2 | 8/2018 | Congdon et al. | |
| 10,567,280 B2 | 2/2020 | Hui et al. | |
| 10,715,485 B2 | 7/2020 | Miller et al. | |
| 10,805,361 B2 | 10/2020 | Sheng et al. | |
| 2009/0052332 A1* | 2/2009 | Fukuyama | H04L 41/06 370/242 |
| 2012/0011172 A1* | 1/2012 | Wada | H04L 41/085 707/812 |

(Continued)

OTHER PUBLICATIONS

Broadband Subscriber Access Protocols-User Guide, Juniper Networks, Jan. 6, 2021 (1,070 pages).

*Primary Examiner* — Oleg Survillo
*Assistant Examiner* — Monishwar Mohan
(74) *Attorney, Agent, or Firm* — Sheridan Ross P.C.

(57) ABSTRACT

According to examples, an apparatus may include a processor and a memory on which are stored machine-readable instructions that when executed by the processor cause the processor to receive a first IP address using a type of a discovery process for discovery of network configuration information. The processor may determine whether the first IP address is a private IP address or a public IP address. The processor may determine a second attribute of the first IP address, which may include information on a routing domain for the first IP address based on the type of the discovery process used for discovery of the network configuration information. The processor may merge the first IP address with a second IP address based on the second attribute of the first IP address, in which the second IP address may be replaced with the first IP address.

20 Claims, 5 Drawing Sheets

(56) References Cited

U.S. PATENT DOCUMENTS

| | | | |
|---|---|---|---|
| 2013/0179582 A1* | 7/2013 | Lee | H04L 65/1043 709/228 |
| 2013/0346619 A1* | 12/2013 | Panuganty | H04L 41/12 709/226 |
| 2015/0295885 A1* | 10/2015 | Congdon | H04L 61/2514 370/392 |
| 2016/0119275 A1* | 4/2016 | Liebherr | H04L 69/40 709/220 |
| 2016/0127193 A1* | 5/2016 | Deniaud | H04L 67/1061 709/208 |
| 2018/0041468 A1* | 2/2018 | Miller | H04L 61/5007 |
| 2020/0235990 A1* | 7/2020 | Janakiraman | H04L 41/0893 |
| 2020/0259796 A1* | 8/2020 | Hicks | H04L 63/164 |
| 2020/0293502 A1* | 9/2020 | Tal | G06F 16/21 |
| 2021/0357427 A1* | 11/2021 | Ben Ari | G06F 16/285 |

* cited by examiner

DETERMINATION OF ROUTING DOMAIN INFORMATION TO MERGE IP ADDRESSES

BACKGROUND

Devices may be implemented in different network environments, such as on-premises and cloud environments, and the devices may be assigned private Internet Protocol (IP) addresses. In some examples, duplicate private IP addresses may be assigned in the different network environments.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
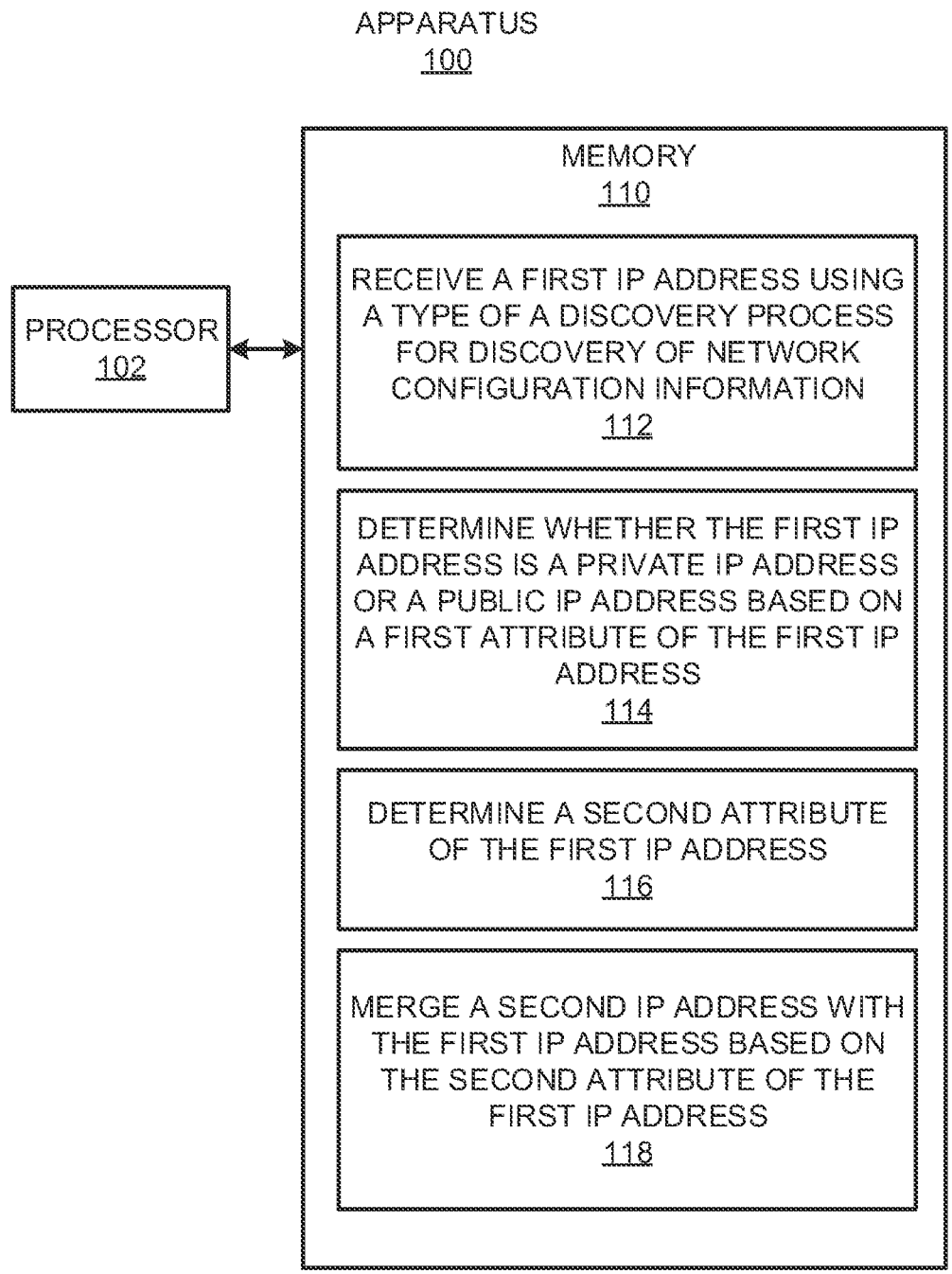
FIG. 1 shows a block diagram of an example apparatus that may receive a first IP address, determine an attribute of the first IP address including information on a routing domain for the first IP address, and merge the first IP address with a second IP address based on the determined attribute.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Generally, management of IP addresses, both public and private IP addresses, may be important for network management. Duplicate private IP addresses may be a cause for increasing concern in complex network environments, particularly for cloud-based virtual networks, such as Virtual Private Cloud (VPC). In some examples, cloud discovery may report IP address information, including private IP addresses and public IP addresses. In the VPC environment, users may be able to assign a private IP range when creating a virtual network or set a static private IP address for specific virtual machine (VM) instances, which may result in increasingly large numbers of duplicate IP addresses. In some instances, it may be difficult to distinguish and preserve multiple IP addresses that have the same value, but which are distinct from one another.

Disclosed herein are methods, apparatuses, and computer-readable mediums that may identify duplicate IP addresses in networks, such as complex networks that may include both on-premises and cloud environments. In some examples, a processor may use routing domain information to distinguish private IP addresses, and may merge IP addresses identified as being duplicates using the routing domain information. In this regard, the processor may receive a first IP address using a discovery process for discovery of network configuration information. The processor may determine whether the first IP address is a private IP address or a public IP address based on a first attribute of the first IP address, and based on a determination that the first IP address is a private IP address, the processor may determine a second attribute of the first IF address that includes information on a routing domain for the first IP address. In some examples, the information on the routing domain may be a unique routing domain identifier, which may be determined through metadata discovery or generated by the job, or a domain name for the first IP address, which may be assigned by an administrator. The information on the routing domain may be based on a type of the discovery process among a plurality of types of discovery processes. In some examples, the processor may merge the first IF address with a second IP address based on the second attribute of the first IP address, including the domain name or the routing domain identifier.

By way of particular example and for purposes of illustration, the processor may be a processor in a server to manage information on assets on a network. The server may generate and maintain information on the assets on the network, such as IP addresses, as configuration items (CIs) in a configuration management database (CMDB). A CI may represent hardware, software, services, business processes, or any component in an information technology (IT) infrastructure. Each CI in the CMDB may be grouped by similar properties under a CI type (CIT). Each CIT may provide a template for creating a CI and its associated properties. In some examples, the server may create a CIT correlating to the first attribute, which may include information to identify whether IP addresses are public or private, and the second attribute, which may include information associated with a routing domain for the IP addresses.

The server may include a plurality of discovery processes that may be used to discover CIs on multiple cloud platforms. The discovery processes may report IP address information for private IP addresses and public IP addresses, and the reported IP address information may correlate with the first attribute and the second attribute. In some examples, the server may use the first attribute to determine whether IP addresses are private IP addresses, and may use the second attribute, which may include routing domain information, to distinguish whether the determined private IP addresses are duplicate IP addresses. In some examples, the plurality of discovery processes may include different types of discovery processes, and the processor may determine the routing domain information based on respective types of the discovery processes.

By enabling a server to determine routing domain attributes for private IP addresses, the server may more efficiently identify duplicates in the private IP addresses, for instance, by distinguishing multiple IP addresses across multiple virtual networks that have the same value. The server may identify duplicate IP addresses in both on-premises and cloud environments, thereby improving the efficiency and accuracy of communications using IP addresses in different environments, which may reduce consumption of computing resources to resolve communication issues caused by the duplicate private IP addresses.

Figure 2:
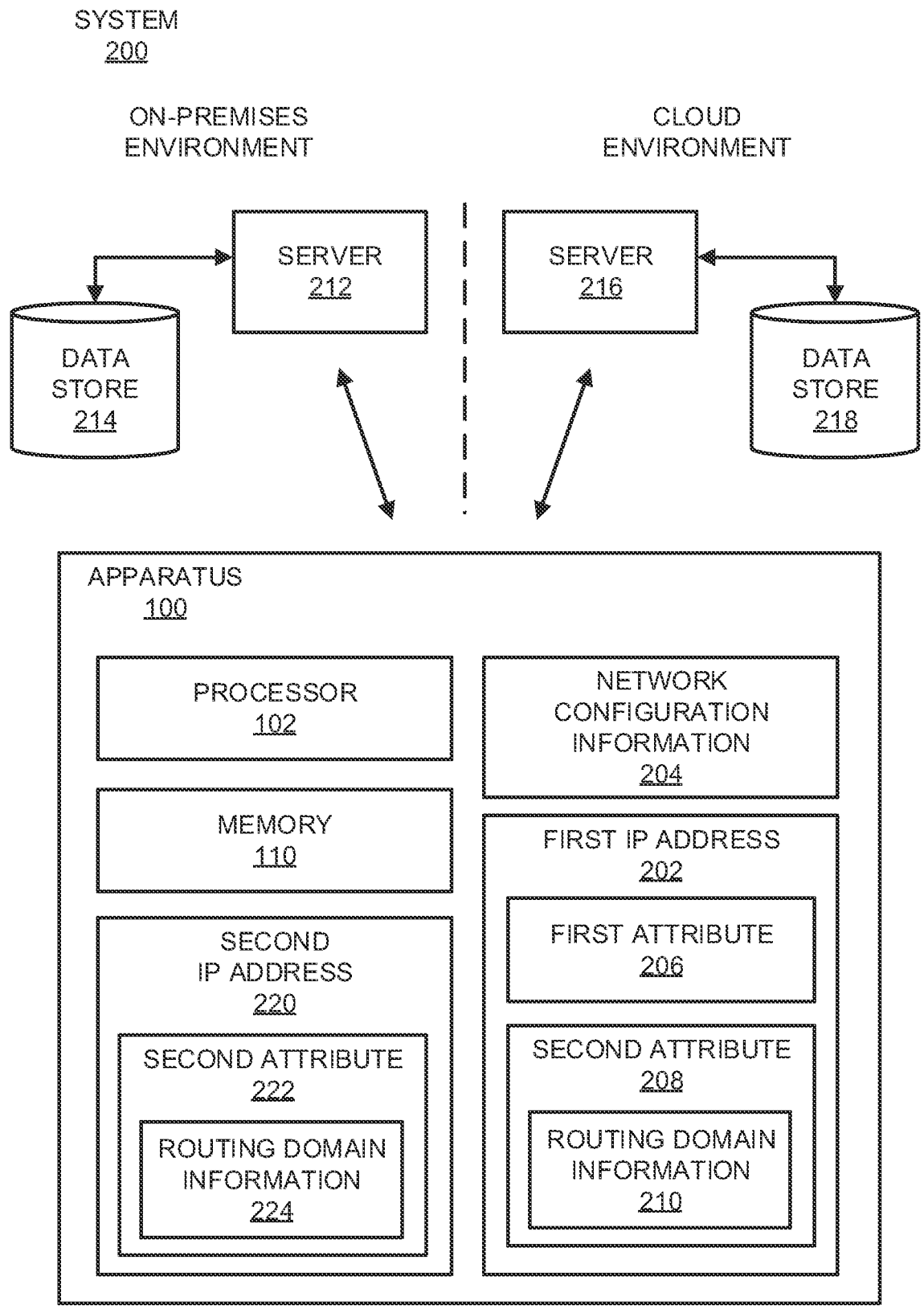
FIG. 2 shows a block diagram of an example system in which the example apparatus depicted in FIG. 1 may be implemented.
Figure 3:
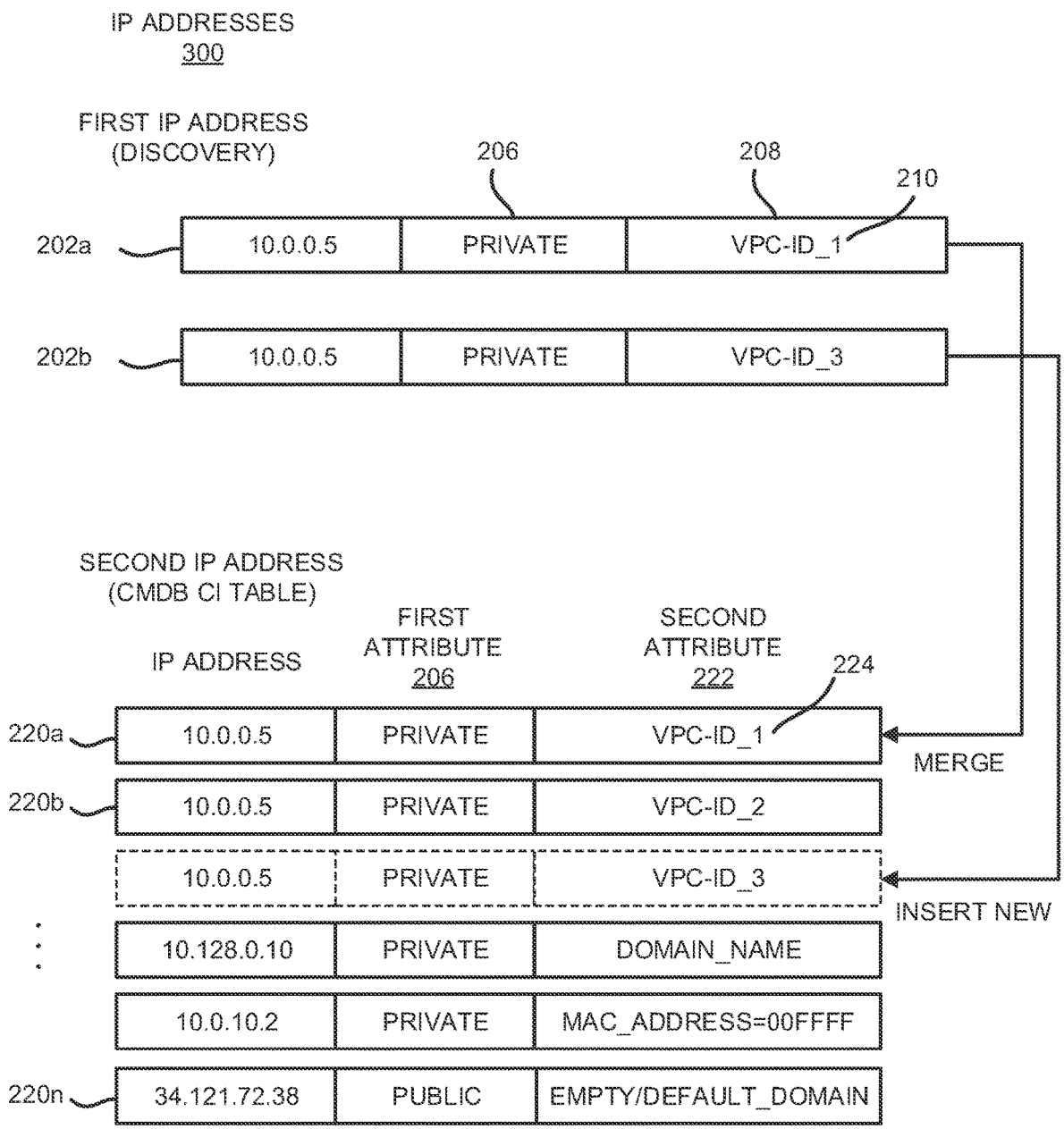
FIG. 3 shows a block diagram of example IP addresses, including the first IP address and the second IP address depicted in FIG. 2.

Reference is made to FIGS. 1, 2, and 3. FIG. 1 shows a block diagram of an example apparatus 100 that may receive a first IP address, determine an attribute of the first IP address including information on a routing domain for the first IP address, and merge the first IP address with a second IP address based on the determined attribute. FIG. 2 shows a block diagram of an example system 200 in which the example apparatus 100 depicted in FIG. 1 may be implemented. FIG. 3 shows a block diagram of example IP addresses, including the first IP address and the second IP address depicted in FIG. 2. It should be understood that the example apparatus 100 depicted in FIG. 1, the example system 200 depicted in FIG. 2, and the example IP addresses 300 depicted in FIG. 3 may include additional features and that some of the features described herein may be removed and/or modified without departing from the scopes of the apparatus 100, the system 200, and/or the IP addresses 300.

The apparatus 100 may be a server (such as a management server), a node in a network (such as a data center), a personal computer, a laptop computer, a tablet computer, a smartphone, and/or the like. As shown, the apparatus 100 may include a processor 102 and a memory 110, e.g., a non-transitory computer-readable medium. In some examples, the apparatus 100 may be a management server in a cloud-based management platform that has stored thereon instructions that may cause the processor 102 to execute discovery processes to discover network configuration information on multiple cloud platforms.

The processor 102 may be a semiconductor-based microprocessor, a central processing unit (CPU), an application specific integrated circuit (ASIC), a field-programmable gate array (FPGA), and/or other hardware device. Although the apparatus 100 is depicted as having a single processor 102, it should be understood that the apparatus 100 may include additional processors and/or cores without departing from a scope of the apparatus 100. In this regard, references to a single processor 102 as well as to a single memory 110 may be understood to additionally or alternatively pertain to multiple processors 102 and/or multiple memories 110.

The memory 110 may be an electronic, magnetic, optical, or other physical storage device that contains or stores executable instructions. The memory 110 may be, for example, Read Only Memory (ROM), flash memory, solid state drive, Random Access memory (RAM), an Erasable Programmable Read-Only Memory (EPROM), an Electrically Erasable Programmable Read-Only Memory (EEPROM), a storage device, an optical disc, or the like. The memory 110 may be a non-transitory computer-readable medium. The term "non-transitory" does not encompass transitory propagating signals.

As shown, the memory 110 may have stored thereon instructions 112-118 that the processor 102 may fetch, decode, and execute. Particularly, the processor 102 may execute the instructions 112-118 to merge private IP addresses based on information on routing domains for the IP addresses. The instructions 112-118 may be non-transitory machine-readable instructions (or equivalently, non-transitory computer-readable instructions).

The processor 102 may fetch, decode, and execute the instructions 112 to receive a first IP address 202 using a type of a discovery process for discovery of network configuration information 204. In some examples, the discovery process may be a process to discover network configuration information 204, for instance, to discover CIs on multiple cloud platforms. In the present disclosure, the discovery process may also be referred to as jobs or discovery jobs.

The discovery process may report various types of network configuration information 204, including private IP addresses and public IP addresses. In this regard, the discovery process may report predetermined types of information based on a type, or purpose, of a particular discovery process. For instance, the type of a particular discovery process may be for an on-premises environment, a cloud environment, and/or the like. In this regard, the type of network configuration information 204 that may be reported by the particular discovery process may include different types of network configuration information 204, such as a domain name, routing domain identifier, and/or the like.

The processor 102 may fetch, decode, and execute the instructions 114 to determine whether the first IP address 202 is a private IP address or a public IP address based on a first attribute 206 of the first IP address 202. In some examples, the processor 102 may add the first attribute 206 to a configuration management database, such as a CMDB, in which the first attribute 206 may be an attribute for an IP address configuration information item type (CIT) in the CMDB that may identify whether the first IP address 202 is a public IP address or a private IP address. In some examples, the processor 102 may create the IP address CIT in the CMBD correlating to the first attribute 206, in which the information associated with each IP address to identify whether IP addresses are public or private may be stored.

Based on a determination that the first IP address 202 is a public IP address, the processor 102 may determine whether the first IP address 202 is a duplicate IP address based on the IP address itself.

Based on a determination that the first IP address 202 is a private IP address, the processor 102 may analyze information related to a routing domain of the first IP address 202 to determine whether the first IP address 202 is a duplicate IP address. In this regard, the processor 102 may fetch, decode, and execute the instructions 116 to determine a second attribute 208 of the first IP address 202. The second attribute 208 may include routing domain information 210 for the first IP address 202 based on a type of the discovery process used for discovery of the network configuration information 204.

The term routing domain as used herein may refer to a collection of networked systems that may operate common routing protocols and may be under the control of a single administration. In some examples, IP addresses in the same routing domain may access each other, and in such instances, duplicate IP addresses may not exist in a single routing domain. As such, certain types of routing domain information 210 for the first IP address 202 may be used to identify and distinguish the first IP address 202 to other IP addresses that are stored, for instance, in the CMDB. In some examples, the second attribute 208 may include the routing domain information 210 for the first IP address 202. The second attribute 208 may include different types of the routing domain information 210, which may be associated with different types of IP addresses.

In some examples, IP addresses may be classified as different types of IP addresses. A routable IP address may be an IP address that exists on a network and may be accessible by a network component through a router or a switch (not shown) to a routing domain. In some examples, the routable IP address may be a public IP address. By way of particular example, a CMDB server may gather information through an interface, which may be referred to as a data flow probe. A data flow probe may be a component responsible for requesting tasks from a server, scheduling and executing discovery and integration tasks, and sending the results back to the CMDB server. Routable IP addresses may be in the same domain as the data flow probe, and when IP addresses are accessible by the data flow probe which report it, those IP addresses may be referred to as routable IP addresses. In some examples, a type of IP addresses may include single IP addresses. A single IP address may be a type of IP address in which the IP address is reported alone, not linked to a node. In some examples, a type of IP addresses may include non-routable IP addresses. Non-routable IP addresses may be private IP addresses, which may not be routable through a router or a switch. For the different types of IP addresses, the processor 102 may receive different types of network configuration information 204, which may be reported to it by different types of discovery processes, and the processor 102 may assign different types of information to the second attribute 208 for the first IP address 202 based on the different types of discovery processes.

The processor 102 may assign the second attribute 208 in the IP address CIT of the CMDB. The second attribute 208 may be assigned based on the type of the discovery process. In some examples, the type of the discovery process may be a type among a plurality of discovery processes that may be available to the processor 102. In some examples, the processor 102 may create the IP address CIT in the CMBD correlating to the second attribute 208, which may include information to uniquely identify and distinguish IP addresses, which may include information associated with a routing domain for the first IP address 202.

The processor 102 may determine whether the type of the discovery process is for an on-premises environment or a cloud environment. In some examples, the processor 102 may access network configuration information 204 from servers 212 and/or 216. The server 212 and a data store 214 connected to the server 212 may be implemented on an on-premises environment, and the server 216 and a data store 218 connected to the server 216 may be implemented in a cloud environment.

Based on a determination that the type of the discovery process is for the on-premises environment, the processor 102 may assign a domain name for the first IP address 202 as the second attribute 208. The domain name may be user configured when setting up the domain and the data flow probe. In some examples, based on a determination that the type of the discovery process is for the cloud environment, the processor 102 may assign a routing domain identifier for the first IP address 202 as the second attribute 208. The processor 102 may determine whether the first IP address 202 is a unique IP address based on a comparison between the second attribute 208 for the first IP address 202 with a second attribute 222, which may include routing domain information 224, for a second IP address 220. In some examples, the second IP address 220 may be an IP address stored as a CI in the CMDB.

The processor 102 may use different methods to determine the routing domain identifier. In some examples, based on the type of the discovery process being a first type in the cloud environment, which may report non-routable IP addresses with node topology, the processor 102 may determine the routing domain identifier based on metadata associated with the first IP address 202. In some examples, the processor 102 may retrieve the metadata associated with the first IP address 202 from a metadata server (not shown) and may perform metadata discovery to obtain information to determine the routing domain identifier. In some examples, based on the type of the discovery process being for a second type in the cloud environment that reports non-routable IP addresses with node topology, which may not be used for integrations, the processor 102 may determine the routing domain identifier based on a virtual private cloud (VPC) identifier generated by the discovery process. In this regard, the discovery process of the second type may report or generate the routing domain identifier, such as the VPC identifier.

TABLE 1

| Job classification | Discovery purpose | Discovery jobs |
| --- | --- | --- |
| Class 1 | Jobs that report Single Routable IP Address | Range IPs by NMAP<br>Range IPs by ICMP<br>IP MAC Harvesting<br>DNS Zone by DNS<br>DNS Zone by nslookup<br>Web Services by UDDI Registry |
| Class 2 | Jobs that report Single Non-Routable IP Address | Manual UriEndpoint Discovery |
| Class 3 | Jobs that report Routable IP Address with node topology | Jobs run in an on-premises environment, including:<br>Host Connection jobs<br>Host Application jobs<br>Inventory Discovery by Scanner |
| Class 4 | Jobs that report Non-Routable IP Address with node topology<br>Jobs that are used for integrations | Jobs run on cloud platforms |
| Class 5 | Same as class 4, jobs that report Non-Routable IP Address with node topology | Call Home Processing<br>Agent Driven Inventory Discovery |

TABLE 1-continued

| Job classification | Discovery purpose | Discovery jobs |
|---|---|---|
| | Jobs that are not used for integrations | Inventory Discovery by Manual Scanner Deployment |

By way of particular example and for purposes of illustration, the processor 102 may use different types of discovery processes, which may be classified according to a discovery purpose, for discovery of the network configuration information 204, as depicted in Table 1. Each of the discovery processes may report IP addresses, but the reported IF addresses may be different for each type of discovery purpose. In some examples, class 1 type jobs may not be run on cloud environments. Class 4 type jobs may not be run on on-premises environments, since these types of jobs may be designed to discover CIs in a cloud environment. In some examples, for on-premises discovery, the processor 102 may assign a domain name as the second attribute 208, which may be user defined during setup. In some examples, for cloud discovery, the processor 102 may assign a domain identifier in lieu of the domain name as the second attribute 208.

TABLE 2

| Job classification | Run jobs in an on-premises environment | Run jobs in a cloud environment |
|---|---|---|
| Class 1 | Domain name | Not run |
| Class 2 | Domain name | Not report |
| Class 3 | Domain name | Routing Domain Identifier by Metadata Discovery |
| Class 4 | Not run | Routing Domain Identifier |
| Class 5 | Domain name | Routing Domain Identifier by Metadata Discovery |

As depicted in Table 2, for each type of discovery process, the processor 102 may assign the second attribute 208 including routing domain information 210 based on different logic, and in some instances, the second attribute 208 may include a unique routing domain identifier. In this example, the domain name assigned to the second attribute 208 for jobs in an on-premises environment may be user configured when setting up the domain and the data flow probe. In Table 2, "Not run" may indicate that this type of discovery process may not run in this instance, "Not report" may indicate that this type of discovery processes may not report IP addresses. "Routing Domain Identifier" may indicate that this type of discovery process may report or generate a routing domain identifier, such as a VPC identifier. "Metadata Discovery" may indicate discovery of the routing domain identifier indirectly, using metadata. In this regard, metadata may be data that may provide information about other data. Metadata may include various types of data, and may be generated for every instance on a cloud platform and stored on a metadata server, such as server 216 depicted in FIG. 2.

The processor 102 may fetch, decode, and execute the instructions 118 to merge the first IP address 202 with the second IP address 220 based on the second attribute 208 of the first IP address 202. The processor 102 may replace or update the second IP address 220 with the first IP address 202 to merge the first IP address 202 with the second IP address 220.

In some examples, the processor 102 may determine whether to merge IP addresses based on whether the IP addresses are a data center type IP addresses or a client type IP addresses. In some examples, the first IP address 202 may be the same as the second IP address 220, and the processor 102 may determine whether the first IP address 202 is a unique IP address with respect to the second IP address 220 based on the type of the first IP address 202. The processor 102 may determine whether the first IP address is the client type IP address that may be associated with an Internet service provider (ISP) or the data center type IP address that may not be associated with the ISP.

Based on a determination that the first IP address 202 is the client type IP address, the processor 102 may merge the first IP address 202 and the second IP address 220 based on a match in a media access control (MAC) address of the first IP address 202 and the second IP address 220. Based on a determination that the first IP address 202 is the data center type IP address, the processor 102 may merge the first IP address 202 and the second IP address 220 based on a match between the routing domain identifier for the first IP address 202, which may be included in the routing domain information 210 in the second attribute 208, with a routing domain identifier for the second IP address 220, which may be included in the routing domain information 224 in the second attribute 222 of the second IP address 220.

In some examples, the processor 102 may assign a domain name as the second attribute 208 for the first IP address 202 based on the type of the discovery process for the first IP address being for on-premises discovery. The processor 102 may assign a routing domain identifier as the second attribute for the first IP address based on the type of the discovery process for the first IP address being for cloud discovery.

The processor 102 may merge the first IP address 202 and the second IP address 220 based on the routing domain identifier for the first IP address 202 matching a routing domain identifier for the second IP address 220. In some examples, the processor 102 may maintain the first IP address 202 and the second IP address 220 as separate IP addresses based on the routing domain identifier for the first IP address 202 being different than the routing domain identifier for the second IP address 220.

TABLE 3

| Is Public IP Address | Routing Domain Identifier | Is Single IP Address | Merge |
|---|---|---|---|
| Y | — | Y/N | Yes |
| N | Not Empty and Equal | Y/N | Yes |
| N | Not Empty and Not Equal | Y/N | No |
| N | Empty | Y | No such case |
| | | N | Merge when node merge |

By way of particular example and for purposes of illustration, the processor 102 may determine whether to merge IP addresses based on a merge logic depicted in Table 3. In some examples, the processor 102 may determine whether the first IP address 202 is a data center type IP address or a client type IP address based on a lease time. In this regard, a data center type IP address may include IP addresses for datacenter proxies which may be not owned by an ISP, and a client type IP address may include residential IP addresses, in which the IP address may be assigned by the ISP.

Based on a determination that the first IP address 202 is a client type IP address, the processor 102 may merge the first IP address 202 when a media access control (MAC) address matches a MAC address of a stored IP address. This type of situation may occur in the on-premises environment, but not the cloud environment.

Based on a determination that the first IP address 202 is a data center type IP address, the processor 102 may apply a merge logic as depicted in Table 3. The processor 102 may determine whether the first IP address 202 is a public IP address, and if so, the processor 102 may merge the first IP address 202 with any stored IP address having the same value, such as the second IP address 220.

Based on a determination that the first IP address 202 is a private IP address, the processor 102 may determine whether the routing domain identifier in the second attribute 208 of the first IP address 202 is empty and whether its value matches a value of the routing domain identifier in the second attribute 222 of the second IP address 220. When the routing domain identifier of the first IP address 202 is not empty and matches that of the second IP address 220, the processor 102 may merge the first IP address 202 and the second IP address 220. When the routing domain identifier is not empty and does not equal that of the second IP address 220, the processor 102 may not merge the first IP address 202 and the second IP address 220, and may maintain the first IP address 202 and the second IP address 220 as separate IP addresses. In some examples, the processor 102 may insert the first IP address 202 as a new CI in the CMDB.

Based on a determination that the routing domain identifier is not included in the second attribute 208 for the first IP address 202 and the first IP address 202 is not a single IP address, the processor 102 may merge the first IP address 202 and the second IP address 220 when the node associated with the first IP address 202 is merged. In some examples, the processor 102 may identify a virtual machine for a node associated with the first IP address 202. The processor 102 may determine a virtual machine unique ID associated with the node, such as a virtual private cloud (VPC) IDs, and may use the virtual machine unique ID to determine whether the first IP address 202 and the second IP address 220 are duplicates, and may merge the first IP address 202 and the second IP address 220.

Referring now to FIG. 3, there is shown a block diagram of example IP addresses 300. As shown, the example IP addresses 300 may include first IP addresses 202a and 202b, which may be the same as the first IP address 202 depicted in FIG. 2, and second IP addresses 220a to 220n, which may be the same as the second IP address 220 depicted in FIG. 2. The first IP address 202a and/or 202b may be an IP address that may be discovered by one of various types of discovery processes, and the second IP addresses 220a to 220n may be IP address CIs stored in a CMDB CI table. In some examples, the second IP addresses 220a to 220n may include the second attribute 222, which may include various types of attributes including the routing domain information 224, such as routing domain IDs or VPC Ds, domain names, default domains, MAC addresses, NULL values or empty fields, or another appropriate type of attribute or identifier which may be used to uniquely identify IP addresses.

By way of particular example and for purposes of illustration, the processor 102 may receive the first IP address 202a, which may include a first attribute 206 to identify whether the first IP address 202a is a public or private IP address and a second attribute 208, which may include routing domain information 210 of the first IP address 202a such as a routing domain ID or a VPC ID, a domain name, a MAC address, a default domain, a NULL value or empty, or another appropriate type of attribute or identifier that may be used to uniquely identify the first IP address 202a.

In some examples, the first IP address 202a may be a CI discovered on different cloud platforms, which may be discovered using various discovery processes, and the second IP addresses 220a to 220n may be IP address type CIs in a CMDB. By way of particular example, the first IP address 202a may have an IP address "10.0.0.5", which may be the same as an IP address "10.0.0.5" assigned to a second IP address 220a in the CMDB. The processor 102 may determine whether the first IP address 202a and the second IP address 220a are duplicate IP addresses based on the routing domain information 210 of the second attribute 208 of the first IP address 202a and the routing domain information 224 of the second attribute 222 of the second IP address 220a. Based on a determination that the routing domain information 210 and 224 for the first IP address 202a and the second IP address 220a are the same, for instance "VPC-ID_1", the processor 102 may merge the two IP addresses as a single CI in the CMDB, for instance, by replacing or updating the second IP address 220a with the first IP address 202a.

In some examples, the processor 102 may maintain the first IP address 202b and the second IP address 220a or 220b as separate IP addresses based on the routing domain identifier for the first IP address 202b being different than the routing domain identifier for the second IP address 220a or 220b. By way of particular example, the processor 102 may determine that the first IP address 202b and the second IP addresses 220a and 220b may have the same IP address, for instance "10.0.0.5", but that the first IP address 202b has different routing domain information 210, for instance, a routing domain ID "VPC-ID_3". In this instance, the processor 102 may maintain the first IP address 202b and the second IP address 220a and 220b as separate IP addresses by inserting the first IP address 202b as a new IP address CI in the CMDB.

Figure 4:
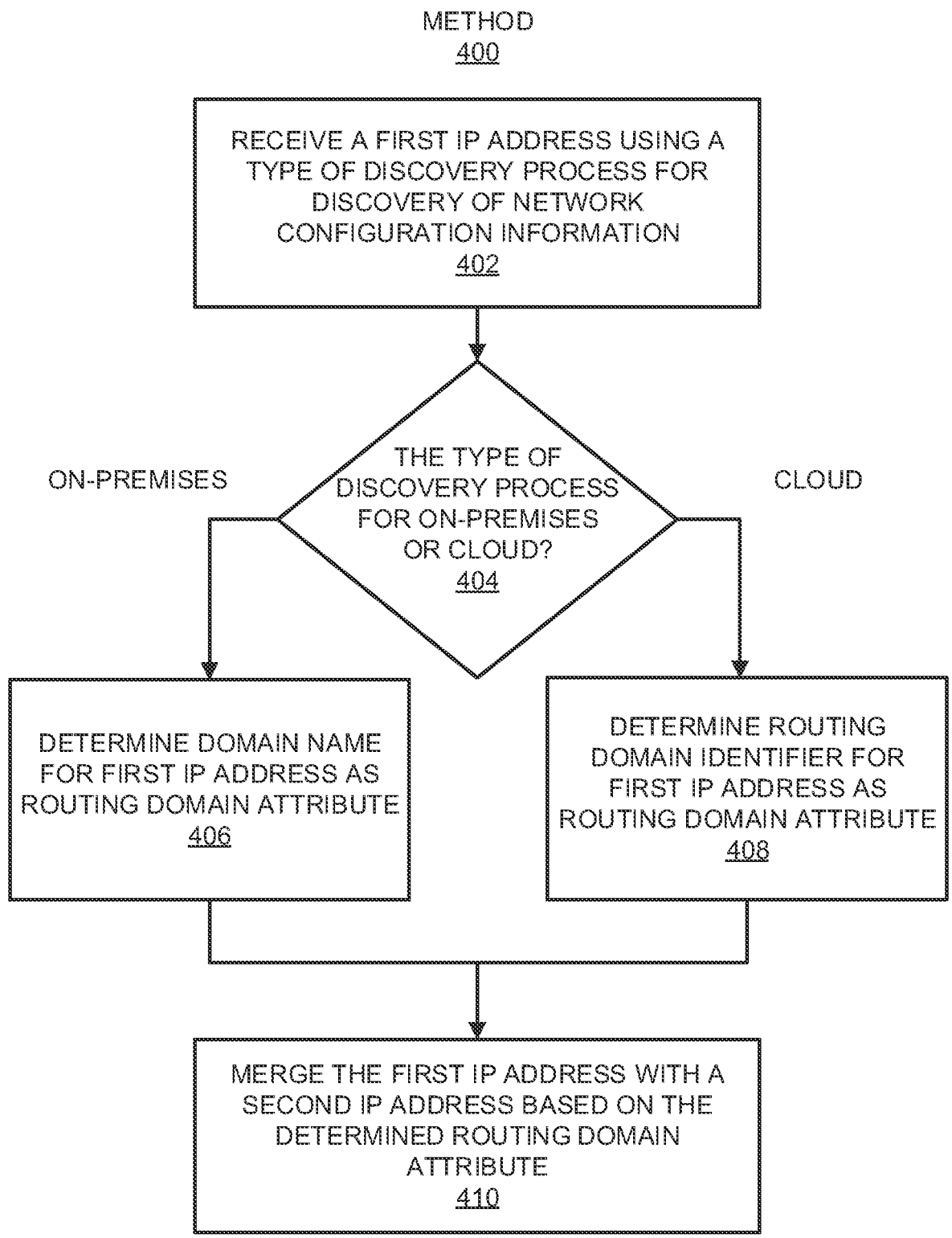
FIG. 4 shows a flow diagram of an example method for determining a routing domain attribute associated with a first IP address, the determined routing domain attribute being based on a type of a discovery process used for the first IP address, and merging the first IP address with a second IP address based on the determined routing domain attribute.

Various manners in which the processor 102 may operate are discussed in greater detail with respect to the method 400 depicted in FIG. 4. FIG. 4 depicts a flow diagram of an example method for determining a routing domain attribute associated with a first IP address 202, the determined routing domain attribute being based on a type of a discovery process used for the first IP address 202, and merging the first IP address 202 with a second IP address 220 based on the determined routing domain attribute. It should be understood that the method 400 depicted in FIG. 4 may include additional operations and that some of the operations described therein may be removed and/or modified without departing from the scope of the method 400. The description of the method 400 is made with reference to the features depicted in FIGS. 1 and 2 for purposes of illustration.

At block 402, the processor 102 may receive a first IP address 202 using a type of a discovery process for discovery of network configuration information 204. At block 404, the processor 102 may determine whether the type of the discovery process for the first IP address 202 is for an on-premises environment or for a cloud environment.

At block 406, based on the type of the discovery process being for the on-premises environment, the processor 102 may assign a domain name as a routing domain attribute for the first IP address 202, such as the second attribute 208 depicted in FIG. 2, and may determine the domain name as the routing domain attribute associated with the first IP address 202.

At block 408, based on the type of the discovery process being for a cloud environment, the processor 102 may assign a routing domain identifier for the first IP address 202 is assigned as the routing domain attribute, and may determine the routing domain identifier as the routing domain attribute.

At block 410, the processor 102 may merge the first IP address 202 with a second IP address 220 based on the determined routing domain attribute associated with the first IP address 202.

The processor 102 may add the routing domain attribute to a CMDB. In some examples, the routing domain attribute may be an attribute for an IP address CIT in the CMDB that may uniquely identify a routing domain for the first IP address 202. The processor 102 may determine whether the first IP address 202 is a unique IP address based on a comparison between the determined routing domain attribute associated with the first IP address 202 with a routing domain attribute for the second IP address 220.

In some examples, based on the type of the discovery process being for a first type in the cloud environment, the processor 102 may determine the routing domain identifier based on metadata associated with the first IP address 202. In this regard, the first type of discovery process may include jobs that may report routable IP addresses with node topology, jobs that report non-routable IP addresses with node topology and which may not be used for integrations.

Based on the type of the discovery process being for a second type in the cloud environment, the processor 102 may determine the routing domain identifier based on a virtual private cloud (VPC) identifier generated by the discovery process. In this regard, the second type of discovery process may include jobs that may report non-routable IP addresses with node topology, which may be used for integrations.

In some examples, the processor 102 may determine whether the first IP address 202 may be a client type IP address that may be associated with an ISP or a data center type IP address that may not be associated with the ISP. Based on a determination that the first IP address 202 is the client type IP address, the processor 102 may merge the first IP address 202 and the second IP address 220 based on a match in a MAC address of the first IP address 202 and the second IP address 220. In some examples, based on a determination that the first IP address is the data center type IP address, the processor 102 may merge the first IP address 202 and the second IP address 220 based on a match between the routing domain identifier for the first IP address 202 with a routing domain identifier for the second IP address 220.

In some examples, the processor 102 may merge the first IP address 202 and the second IP address 220 based on the routing domain identifier for the first IP address 202 matching the routing domain identifier for the second IP address 220. The processor 102 may maintain the first IP address 202 and the second IP address 220 as separate IP addresses based on the routing domain identifier for the first IP address 202 being different from the routing domain identifier for the second IP address 220.

Some or all of the operations set forth in the method 400 may be included as utilities, programs, or subprograms, in any desired computer accessible medium. In addition, the method 400 may be embodied by computer programs, which may exist in a variety of forms both active and inactive. For example, they may exist as machine readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic apparatus capable of executing the above-described functions may perform those functions enumerated above.

Figure 5:
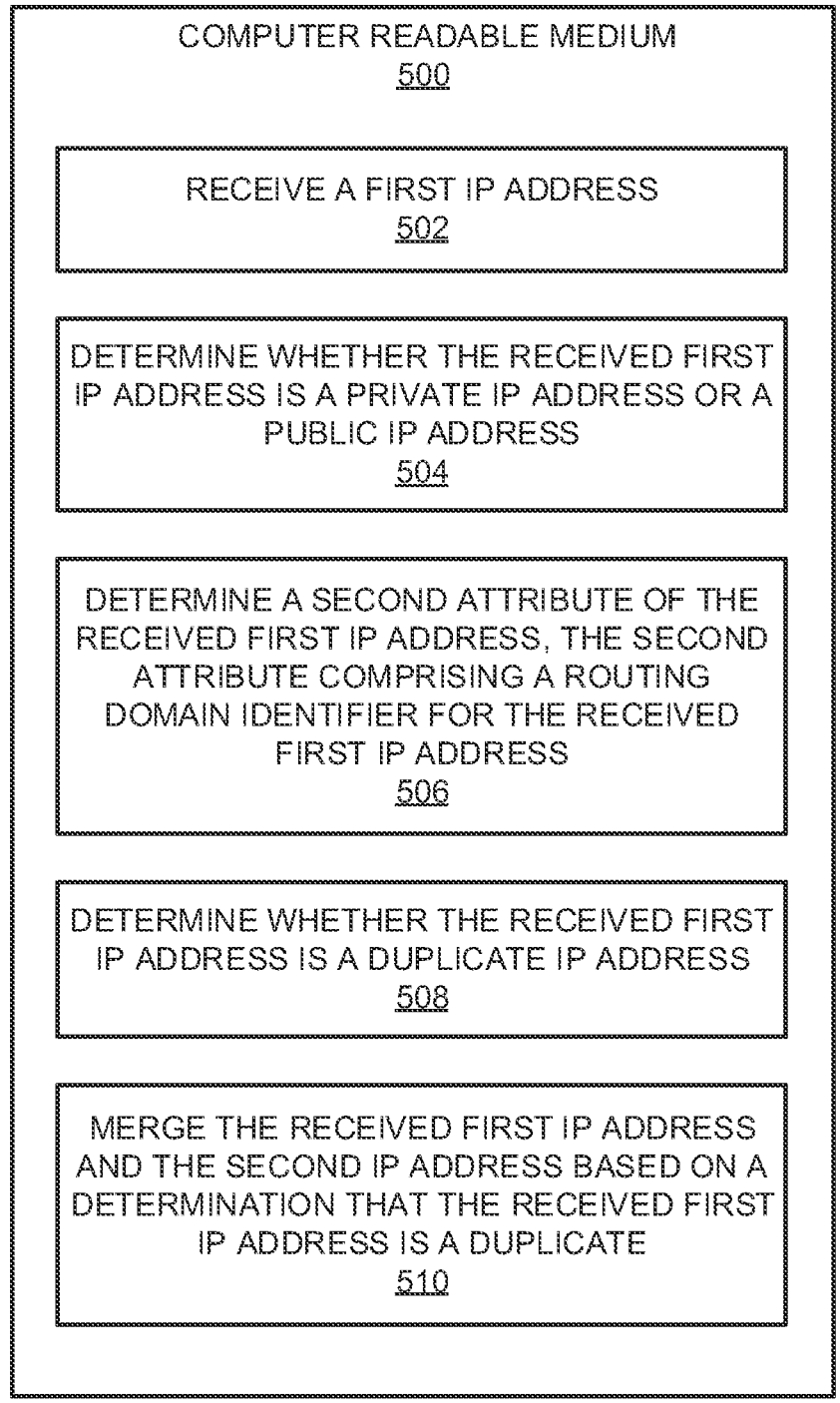
FIG. 5 shows a block diagram of an example non-transitory computer-readable medium that may have stored thereon machine readable instructions to determine an attribute for a first IP address including a routing domain identifier, and to merge the first IP address with a second IP address based on a determination that the first IP address is a duplicate IP address based on the determined attribute for the first IP address.

Turning now to FIG. 5, there is shown a block diagram of an example non-transitory computer-readable medium 500 that may have stored thereon machine readable instructions to determine an attribute for a first IP address including a routing domain identifier, and to merge the first IP address with a second IP address based on a determination that the first IP address is a duplicate IP address based on the determined attribute for the first IP address. It should be understood that the computer-readable medium 500 depicted in FIG. 5 may include additional instructions and that some of the instructions described herein may be removed and/or modified without departing from the scope of the computer-readable medium 500 disclosed herein. The computer-readable medium 500 may be a non-transitory computer-readable medium. The term "non-transitory" does not encompass transitory propagating signals. The description of the non-transitory computer-readable medium 500 is also made with reference to the features depicted in FIGS. 1 and 2 for purposes of illustration. Particularly, the processor 102 of the apparatus 100 may execute some or all of the instructions 502-510 included in the non-transitory computer-readable medium 500.

The computer-readable medium 500 may have stored thereon machine-readable instructions 502-510 that a processor, such as the processor 102 depicted in FIGS. 1 and 2, may execute. The computer-readable medium 500 may be an electronic, magnetic, optical, or other physical storage device that contains or stores executable instructions. The computer-readable medium 500 may be, for example, RAM, EEPROM, a storage device, an optical disc, or the like.

The processor may fetch, decode, and execute the instructions 502 to receive a first IP address 202 using a discovery process for discovering network configuration information 204. The processor may Fetch, decode, and execute the instructions 504 to determine whether the received first IP address 202 is a private IP address or a public IP address based on a first attribute 206 of the first IP address 202.

The processor may fetch, decode, and execute the instructions 506 to determine a second attribute 208 of the received first IP address 202 based on a determination that the received first IP address 202 is a private IP address. In some examples, the second attribute 208 may include a routing domain identifier for the received first IP address 202.

The processor may fetch, decode, and execute the instructions 508 to determine whether the received first IP address 202 is a duplicate IP address based on whether the routing domain identifier for the received first IP address 202 matches a routing domain identifier for a second IP address 220.

The processor may fetch, decode, and execute the instructions 510 to merge the received first IP address 202 and the second IP address 220 based on a determination that the received first IP address 202 is a duplicate IP address of the second IP address 220.

In some examples, based on a type of the discovery process being for a first type of discovery process for a cloud environment, the processor may determine the routing domain identifier based on metadata associated with the received first IP address 202. Based on a type of the discovery process being for a second type of discovery process for a cloud environment, the processor may determine the routing domain identifier based on VPC identifier generated by the discovery process.

In some examples, the processor may determine whether the received first IP address 202 is a client type IP address that may be associated with an ISP or a data center type IP address that may not be associated with the ISP. Based on a determination that the received first IP address 202 is the client type IP address, the processor may merge the received first IP address 202 and the second IP address 220 based on a match in a MAC address of the received first IP address 202 and the second IP address 220. Based on a determination that the received first IP address 202 is the data center type IP address, the processor 102 may merge the received first IP address 202 and the second IP address 220 based on a match between the routing domain identifier for the received first IP address 202 with the routing domain identifier for the second IP address 220.

In some examples, based on the type of the discovery process for the received first IP address 202 being for on-premises discovery, the processor may assign a domain name as the second attribute 208 for the received first IP address 202, and based on the type of the discovery process for the received first IP address being for cloud discovery, the processor may assign the routing domain identifier as the second attribute 208 for the received first IP address 202.

In some examples, the processor may maintain the received first IP address 202 and the second IP address 220 as separate IP addresses based on the routing domain identifier for the received first IP address 202 being different from the routing domain identifier for the second IP address 220.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method comprising:
   receiving, by a processor, a first IP address using a type of a discovery process for discovery of network configuration information;
   determining, by the processor, the type of the discovery process used for discovery of the network configuration information;
   based on the determined type of the discovery process used for discovery of the network configuration information, determining, by the processor, a routing domain attribute associated with the first IP address, wherein:
   when the determined type of the discovery process is for an on-premises environment, a domain name for the first IP address is assigned as the routing domain attribute; and
   when the determined type of the discovery process is for a cloud environment, a routing domain identifier for the first IP address is assigned as the routing domain attribute;
   determining, by the processor, whether the first IP address and a second IP address, which has a same IP address value as the first IP address, are duplicates of each other based on the determined routing domain attribute associated with the first IP address; and
   based on a determination that the first IP address is a duplicate of the second IP address, merging, by the processor, the first IP address with the second IP address.

2. The method of claim 1, further comprising:
   adding the routing domain attribute to a configuration management database (CMDB), the routing domain attribute being an attribute for an IP address configuration item type (CIT) in the CMDB that uniquely identifies a routing domain for the first IP address.

3. The method of claim 1, further comprising:
   determining whether the first IP address is a unique IP address based on a comparison between the determined routing domain attribute associated with the first IP address with a routing domain attribute for the second IP address.

4. The method of claim 1, further comprising:
   based on the type of the discovery process being for a first type in the cloud environment, determining the routing domain identifier based on metadata associated with the first IP address; and
   based on the type of the discovery process being for a second type in the cloud environment, determining the routing domain identifier based on a virtual private cloud (VPC) identifier generated by the discovery process.

5. The method of claim 1, further comprising:
   determining whether the first IP address is a client type IP address that is associated with an Internet service provider (ISP) or a data center type IP address that is not associated with the ISP;
   based on a determination that the first IP address is the client type IP address, merging the first IP address and the second IP address based on a match in a media access control (MAC) address of the first IP address and the second IP address; and
   based on a determination that the first IP address is the data center type IP address, merging the first IP address and the second IP address based on a match between the routing domain identifier for the first IP address with a routing domain identifier for the second IP address.

6. The method of claim 1, further comprising:
   merging the first IP address and the second IP address based on the routing domain identifier for the first IP address matching a routing domain identifier for the second IP address; and
   maintaining the first IP address and the second IP address as separate IP addresses based on the routing domain identifier for the first IP address being different from the routing domain identifier for the second IP address.

7. An apparatus comprising:
a processor; and
a memory storing machine-readable instructions that, when executed by the processor, cause the processor to:
receive a first IP address using a type of a discovery process for discovery of network configuration information, the first IP address having a first attribute for a private IP address;
determine the type of the discovery process used for discovery of the network configuration information;
based on the determined type of the discovery process used for discovery of the network configuration information, determine a second attribute of the first IP address, the second attribute of the first IP address comprising a different type of information on a routing domain for the first IP address based on the determined type of the discovery process;
determine whether the first IP address and a second IP address, which has a same IP address value as the first IP address, are duplicates of each other based on the second attribute of the first IP address; and
based on a determination that the first IP address is a duplicate of the second IP address, merge the first IP address with the second IP address, the second IP address being replaced with the first IP address.

8. The apparatus of claim 7, wherein the instructions cause the processor to:
determine whether the first IP address is a private IP address or a public IP address based on the first attribute of the first IP address;
based on a determination that the first IP address is a private IP address, determine the type of the discovery process used for discovery of the network configuration information; and
add the first attribute to a configuration management database (CMDB), the first attribute being an attribute for an IP address configuration item type (CIT) in the CMDB that identifies whether an IP address is a public IP address or a private IP address.

9. The apparatus of claim 8, wherein the instructions cause the processor to:
assign the second attribute in the IP address CIT of the CMDB, the second attribute being assigned based on the type of the discovery process, wherein the type of the discovery process is a type among a plurality of discovery processes that are available to the processor.

10. The apparatus of claim 7, wherein the instructions cause the processor to:
determine whether the type of the discovery process is for an on-premises environment or a cloud environment;
based on a determination that the type of the discovery process is for the on-premises environment, assign a domain name for the first IP address as the second attribute; and
based on a determination that the type of the discovery process is for the cloud environment, assign a routing domain identifier for the first IP address as the second attribute.

11. The apparatus of claim 10, wherein the instructions cause the processor to:
determine whether the first IP address is a unique IP address based on a comparison between the second attribute for the first IP address with a second attribute for the second IP address.

12. The apparatus of claim 10, wherein the instructions cause the processor to:
based on the type of the discovery process being a first type in the cloud environment that reports non-routable IP addresses with node topology, determine the routing domain identifier based on metadata associated with the first IP address; and
based on the type of the discovery process being for a second type in the cloud environment that reports non-routable IP addresses with node topology, determine the routing domain identifier based on a virtual private cloud (VPC) identifier generated by the discovery process.

13. The apparatus of claim 7, wherein, based on the first IP address being the same as the second IP address, the instructions cause the processor to:
determine whether the first IP address is a client type IP address that is associated with an Internet service provider (ISP) or a data center type IP address that is not associated with the ISP;
based on a determination that the first IP address is the client type IP address, merge the first IP address and the second IP address based on a match in a media access control (MAC) address of the first IP address and the second IP address; and
based on a determination that the first IP address is the data center type IP address, merge the first IP address and the second IP address based on a match between a routing domain identifier in the second attribute for the first IP address with a routing domain identifier for the second IP address.

14. The apparatus of claim 7, wherein the instructions cause the processor to:
based on the type of the discovery process for the first IP address being for on-premises discovery, assign a domain name as the second attribute for the first IP address; and
based on the type of the discovery process for the first IP address being for cloud discovery, assign a routing domain identifier as the second attribute for the first IP address.

15. The apparatus of claim 14, wherein the instructions cause the processor to:
merge the first IP address and the second IP address based on the routing domain identifier for the first IP address matching a routing domain identifier for the second IP address; and
maintain the first IP address and the second IP address as separate IP addresses based on the routing domain identifier for the first IP address being different than the routing domain identifier for the second IP address.

16. A non-transitory computer readable medium on which is stored machine readable instructions that, when executed by a processor, cause the processor to:
receive a first IP address using a discovery process for discovering network configuration information, the first IP address having a first attribute for a private IP address;
determine a type of the discovery process used for discovery of the network configuration information;
based on the determined type of the discovery process used for discovering the network configuration information, determine a second attribute of the received first IP address, the second attribute comprising a routing domain identifier for the received first IP address based on the determined type of the discovery process;

determine whether the received first IP address and a second IP address, which has a same IP address value as the first IP address, are duplicates of each other based on whether the routing domain identifier for the received first IP address matches a routing domain identifier for the second IP address; and merge the received first IP address and the second IP address based on a determination that the received first IP address is a duplicate IP address of the second IP address.

17. The non-transitory computer readable medium of claim 16, wherein:

based on the type of the discovery process being for a first type of discovery process for a cloud environment, determine the routing domain identifier based on metadata associated with the received first IP address; and based on the type of the discovery process being for a second type of discovery process for a cloud environment, determine the routing domain identifier based on a virtual private cloud (VPC) identifier generated by the discovery process.

18. The non-transitory computer readable medium of claim 16, wherein the instructions cause the processor to:

determine whether the received first IP address is a client type IP address that is associated with an Internet service provider (ISP) or a data center type IP address that is not associated with the ISP;

based on a determination that the received first IP address is the client type IP address, merge the received first IP address and the second IP address based on a match in a media access control (MAC) address of the received first IP address and the second IP address; and based on a determination that the received first IP address is the data center type IP address, merge the received first IP address and the second IP address based on a match between the routing domain identifier for the received first IP address with the routing domain identifier for the second IP address.

19. The non-transitory computer readable medium of claim 16, wherein the instructions cause the processor to:

based on the type of the discovery process for the received first IP address being for on-premises discovery, assign a domain name as the second attribute for the received first IP address; and based on the type of the discovery process for the received first IP address being for cloud discovery, assign the routing domain identifier as the second attribute for the received first IP address.

20. The non-transitory computer readable medium of claim 19, wherein the instructions cause the processor to:

maintain the received first IP address and the second IP address as separate IP addresses based on the routing domain identifier for the received first IP address being different from the routing domain identifier for the second IP address.

\* \* \* \* \*